United States Patent [19]

Dodd

[11] 4,074,685
[45] Feb. 21, 1978

[54] APPARATUS FOR MIXING MEDICATION WITH WATER SUPPLY

[76] Inventor: Gilbert E. Dodd, Rte. 6, Boaz, Ala. 35957

[21] Appl. No.: 706,114

[22] Filed: July 16, 1976

[51] Int. Cl.² ............................................ F16K 19/00
[52] U.S. Cl. ............................ 137/101.11; 137/205.5
[58] Field of Search ............... 137/101.11, 205.5, 599, 137/599.1; 23/172.7, 172.8; 239/317

[56] References Cited

U.S. PATENT DOCUMENTS

| | | | |
|---|---|---|---|
| 1,079,721 | 11/1913 | Pungs | 137/205.5 |
| 2,714,963 | 8/1955 | Lester et al. | 137/101.11 |
| 2,889,995 | 6/1959 | Borell | 137/205.5 |

Primary Examiner—Robert G. Nilson
Attorney, Agent, or Firm—Berman, Aisenberg & Platt

[57] ABSTRACT

A coiled clear plastic tube is disposed within a wire basket support and contains a liquid medication to be mixed with another liquid, such as water. The inlet end of the coiled tube is connected through a valve to a source of water pressure which serves as a motive force to drive the medication within the coiled tube to its outlet end. A portion of the water supply is diverted in the valve and is directed to a mixing valve to which is also coupled the outlet end of the coiled tube. A reduced diameter orifice controls the feed of the medication to the mixing valve such that the outlet of the latter provides a controlled mixture of water and medication.

15 Claims, 3 Drawing Figures

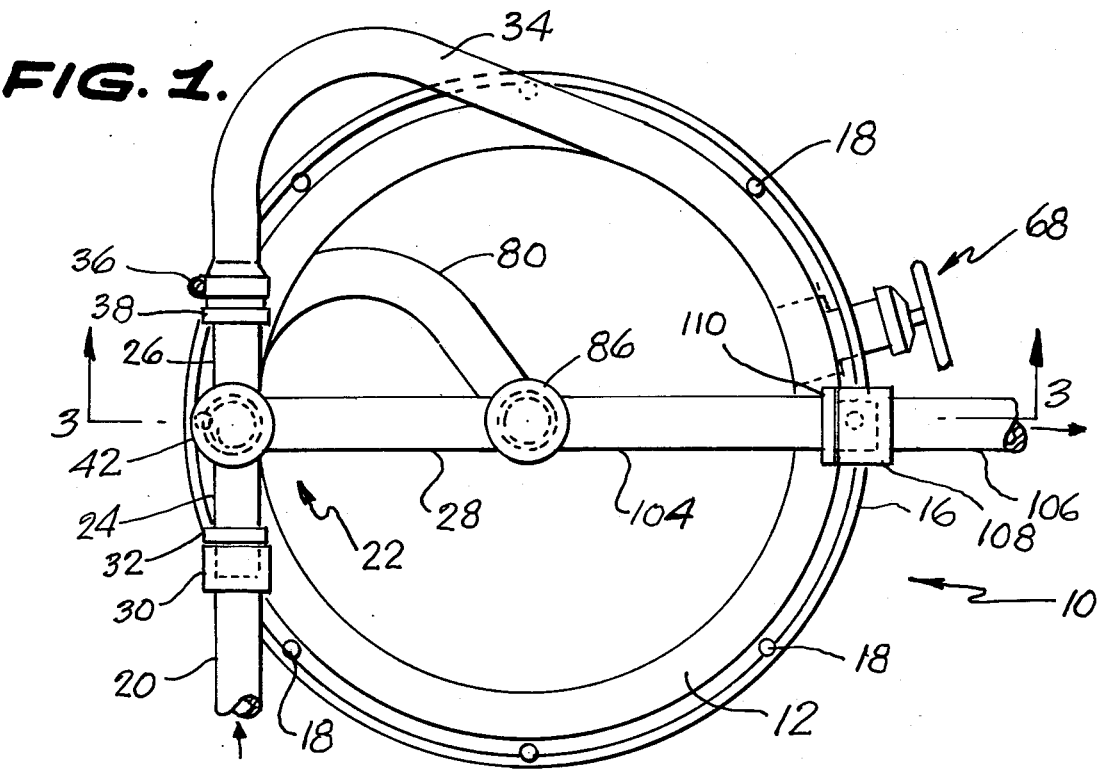
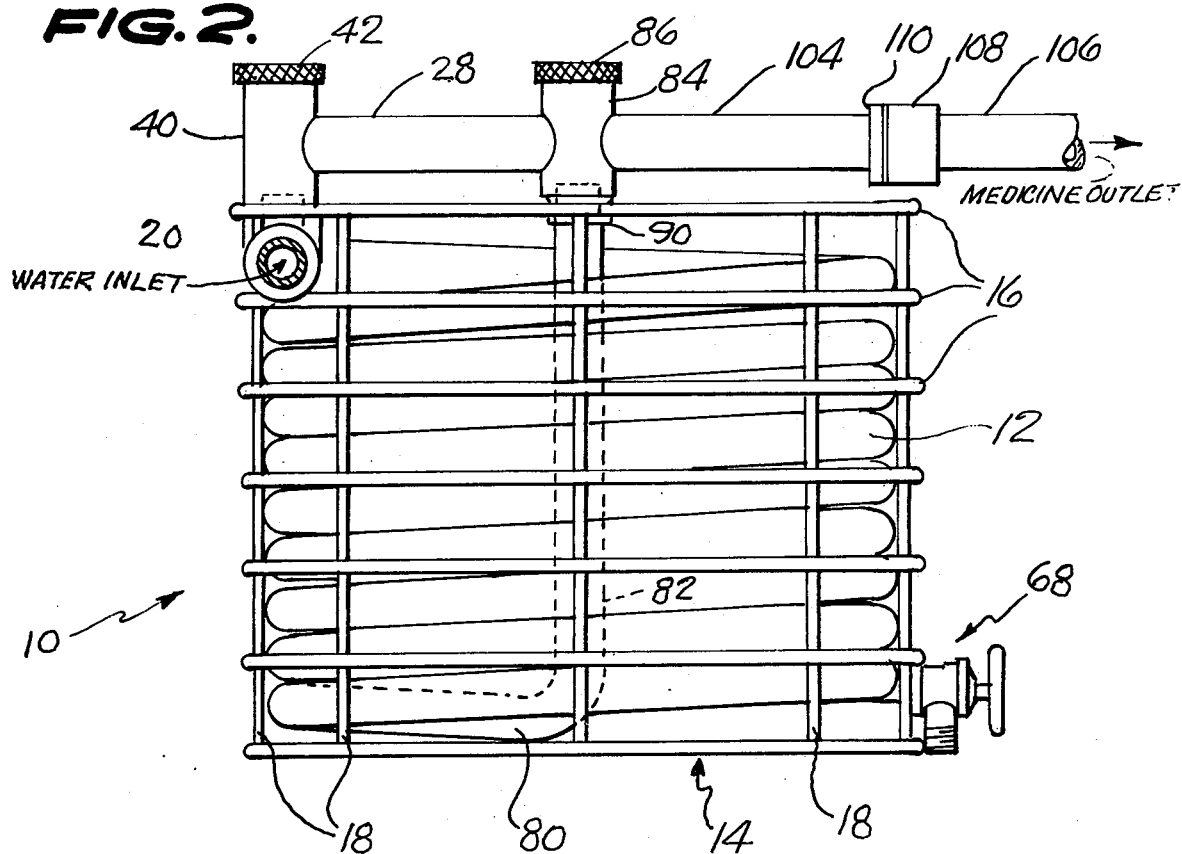

APPARATUS FOR MIXING MEDICATION WITH WATER SUPPLY

BACKGROUND OF THE INVENTION

1. Field of the Invention

The present invention is directed towards apparatus for mixing two liquids in controlled amounts and, more particularly, is directed towards a medicator for admixing a liquid medicine with a main water supply.

2. Description of the Prior Art

In the feeding and care of livestock and poultry, it is common to provide a device for mixing medication with, for example, drinking water. Generally speaking, the medication is in the form of a liquid, and such devices are designed to provide controlled mixing, either by rate or volume, of the liquid medication with the drinking water.

While many designs and variations of such medicators, as they are commonly known, are presently on the market, I have found that each suffers from one or more deficiencies which makes utilization of same unreliable and bothersome. Generally speaking, the problems associated with the prior art medicators center on their undue complexity, multiplicity of moving parts which tend to break down and require replacement, high pressure sealing requirements which often lead to leakages, breakdown, and expensive repair, high cost, and resultant high unreliability.

Typical of the prior art medicators is described in U.S. Pat. No. 3,084,712 issued to Brown. In the apparatus taught by Brown, a medicine-containing flexible bag 80 is positioned within a tight-walled container 70. Water from a source of supply is directed into the container 70 with a force sufficient to collapse the medicine-containing bag 80 which, in turn, forces the medicine through a tube 89 to a mixing valve where it is admixed with a main water supply.

Proper operation of the Brown apparatus requires a large amount of water pressure for collapsing the flexible bag. This water pressure tends to blow the seal rings and has even been known to cause fracture of the main holding tank. The flexible bag itself, subjected to continuous flexing and pressure, also tends to rupture at frequent intervals, requiring repair, replacement, and concomitant shut-down time. The multiplicity of moving parts and frequent maintenance required by devices such as that taught by Brown are serious deficiencies in the administration of an efficient livestock medication program.

Another deficiency inherent in the type of device taught by Brown results from the tendency of the medication to settle in the bottom of the collapsible bag. Since the bag will not be completely emptied, some of the medicine will either be wasted or must be manually mixed and added to the water supply. Over a period of time, this can result in considerable waste and resulting higher expense.

Other prior art U.S. Pat. Nos. in this field of which I am aware include the following: 1,405,334; 2,621,795; 2,716,509; 2,780,493; 2,921,715; 3,149,759; and 3,511,414.

OBJECT AND SUMMARY OF THE INVENTION

It is accordingly a primary object of the present invention to provide an apparatus for mixing a liquid medication with a water supply which overcomes all of the deficiencies noted above with respect to prior art devices.

Another object of the preset invention is to provide an apparatus for mixing a first liquid with a second liquid which is simple in construction, devoid of moving parts, requires little or no maintenance, and can be inexpensively manufactured and efficiently operated.

An additional object of the present invention is to provide an apparatus for mixing a liquid medication with a source of water supply which may be easily constructed of inexpensive readily available components, which requires no moving parts, and which is highly reliable in operation.

A still further object of the present invention is to provide a medicator for livestock which permits accurate and simple control of the amount of medicine admixed with a main source of water supply, and which provides an easily visually observable indication of the proper functioning of the medicator as well as the need for refilling same.

The foregoing and other objects are attained in accordance with one aspect of the present invention through the provision of apparatus for mixing a first liquid with a second liquid, which comprises means for containing the first liquid, conduit means for providing a second liquid to be mixed with the first liquid, means connecting the containing means with the conduit means for combining the first and second liquids, and means in fluid communication with the containing means for driving the first liquid to the connecting means. In a preferred embodiment, the driving means comprises the second liquid which is coupled to the inlet end of the containing means that preferably comprises a tubular conduit whose outlet end is coupled to the combining means.

In accordance with other aspects of the present invention, the tubular conduit is configured as a coil, its inlet end being disposed at the upper portion thereof, its outlet end coupled to the bottom portion thereof. The conduit means for providing the second liquid which, for example, comprises water, includes a water source for delivering same to a valve means which directs a first portion thereof to the combining means and a second portion thereof to the inlet end of the tubular conduit. More particularly, the valve means includes an inlet coupled to the source of water, a first outlet coupled to the inlet end of the tubular conduit, a central chamber disposed between and in fluid communication with the inlet and the first outlet, and a second outlet adjacent to and in fluid communication with the central chamber, the second outlet also being coupled to the combining means. Preferably, the valve means further comprises means disposed between the central chamber and the second outlet for controlling the amount of water delivered to the combining means. In a preferred embodiment, the controlling means comprises a reduced diameter orifice formed in a washer which is disposed above the central chamber of the valve means.

In accordance with yet other aspects of the present invention, the tubular conduit is preferably comprised of a translucent plastic, the first liquid comprising a liquid medication that is generally colored in order to enable visual observation of the amount thereof contained within the coiled tube. The coiled tube is preferably oriented about a central vertically disposed axis and is disposed below the combining means. The combining means more particularly includes a first inlet port coupled to receive the first portion of water, a second inlet port coupled to receive the medication from the coiled tube, a mixing chamber in fluid communication with the first and second inlet ports, and an outlet ports for delivering the mixed water and medication to a desired location. The second inlet port preferably includes a reduced diameter orifice means for controlling the amount of medication admitted to the mixing chamber.

In accordance with still other aspects of the present invention, the valve means and the combining means are each provided with threaded removable closure tops which are utilized during a refilling operation. Means for draining the coiled tube are also preferably provided at the bottom portion thereof, the entire coiled tube being supported by a wire basket. The amount of medicine admixed with the water may be controlled by controlling the sizes of the reduced diameter orifices positioned in the valve means and combining means.

BRIEF DESCRIPTION OF THE DRAWINGS

Various objects, features and attendant advantages of the present invention will be more fully appreciated as the same become better understood from the following detailed description thereof when considered in connection with the accompanying drawings, in which:

FIG. 1 is a top plan view of a preferred embodiment of the liquid medicator according to the present invention;

FIG. 2 is a side view of the preferred embodiment illustrated in FIG. 1; and

DETAILED DESCRIPTION OF THE PREFERRED EMBODIMENT

Figure 3:
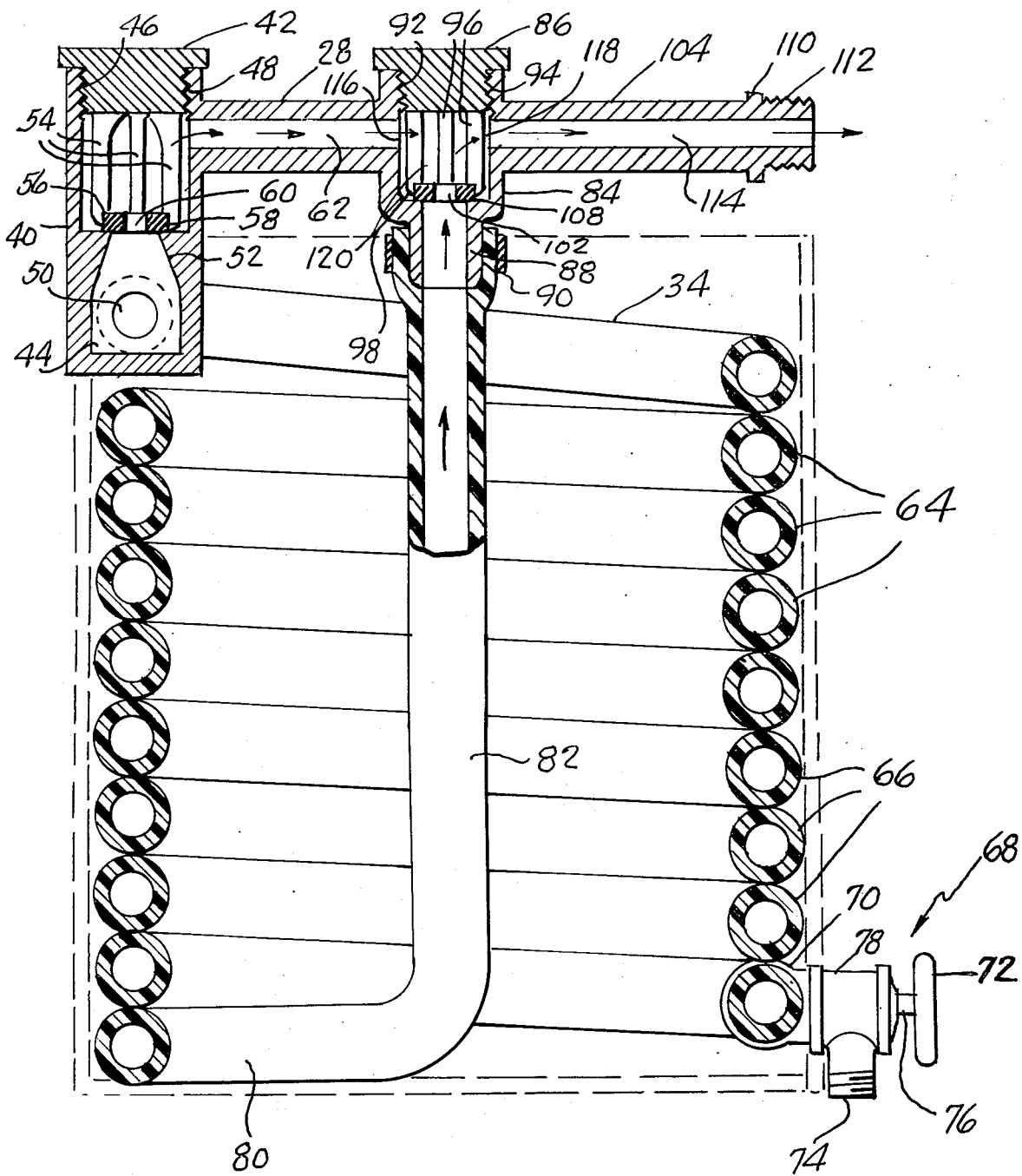
FIG. 3 is an enlarged cross-sectional view of the preferred embodiment of the present invention illustrating its internal construction in more detail and taken along line 3—3 of FIG. 1.

Referring now to the drawings, wherein like reference numerals indicate identical or corresponding parts throughout the several views, and more particularly to FIGS. 1 and 2 thereof, there is illustrated in a top and side view, respectively, a preferred embodiment of the medicator of the present invention which is indicated generally by the reference numeral 10.

The medicator 10 includes a tubular conduit 12 which is preferably configured in a helical coil configuration and is adapted to contain the desired liquid medication therein, as will become more clear hereinafter. Coiled tube 12 is preferably comprised of a clear plastic so as to enable easy observation of the colored medicine therein contained, and may be typically sized on the order of a ¾-inch inner diameter.

Coiled tube 12 is supported by a wire basket holder indicated generally by the reference numeral 14, which includes a plurality of horizontally disposed and vertically spaced support wires 16, and a plurality of vertically disposed support wires 18 which are spaced about the circumference of the coiled tube 12 as clearly illustrated in FIG. 1. clearly, other support means and configurations would be equally useful, wire basket 14 being shown as the preferred mode for enabling observation of the contents of coiled tube 12.

The medicator 10 is supplied by a water inlet pipe 20 which is connected to a suitable pressured source of water (not shown). The inlet pipe 20 feeds to a T-section indicated generally by the reference numeral 22, which comprises a water inlet leg 24, a water outlet leg 26, and a second controlled water outlet leg 28. Legs or conduits 24, 26 and 28 extend from and are in full communication with a substantially cylindrical T-valve 40. The other end of inlet leg 24 is coupled to inlet pipe 20 via a threaded connector 30 which cooperates with a flange 32 formed on inlet leg 24 to seal the joint.

The coiled plastic tube 12 includes an inlet end 34 which is coupled to the distal end of water outlet leg 26. Inlet end 34 of tube 12 is preferably flared over the distal end of leg 26 and clamped by a fastening means 36 which may comprise a conventional hose clamp, for example. Flange 38 on leg 26 aids in sealing the joint.

Referring now to FIG. 3, the cylindrical T-valve 40 includes a valve access plug 42 disposed on the top portion thereof which is threaded as at 46 to cooperate with a tapped bore 48 of valve 40.

The lower portion of valve 40 includes a central chamber 44 which defines co-extensive inlet and outlet ports with which the inlet and outlet ports 24 and 26 are in open fluid communication, reference numeral 50 indicating the inner aperture of outlet leg 26. The inlet and outlet ports of valve 40 disposed on either side of central chamber 44 are spaced by the diameter of valve 40. The central chamber 44 is defined by a gradually upwardly tapering wall 52 which defines a substantially circular opening at the top portion thereof.

Positioned over the top portion of wall 52 and defining the boundary of central chamber 44 is a gasket, plug, or washer 58 having a centrally formed generally circular restricting orifice 60 the size of which control the amount of water flowing upwardly therethrough. Washer 58 is secured in place over the upper opening of wall 52 by a plurality of prongs 54 preferably integrally formed and extending downwardly from the lower wall of closure plug 42. At the bottom of each of the prongs 54 is formed an L-shaped notch 56 for engaging the peripheral edges of washer 58 to secure same.

Water outlet leg 28 extending from valve 40 has an inner channel 62 for receiving the portion of the main water supply delivered through restricting orifice 60. The main water pressure is fed through central chamber 44 of valve 40 to the inlet end 34 of tube 12 which is coiled in a skewed or inclined configuration as clearly illustrated in FIG. 3. Coil 12 includes a plurality of upper coiled rows 64 and a plurality of lower coiled rows 66 which generally contain the liquid medicine to be mixed.

A drain valve 68 is preferably provided and is suitably tapped into the lowermost coil 70 of coiled tube 12. Drain valve 68 includes a housing 78 containing a conventional valve, a manually operable handle 72 coupled to the valve within housing 78 by a shaft 76, and an outlet 74.

Coiled tube 12 is further defined by an outlet end 80 which extends to the central axis thereof to a vertically disposed outlet portion 82. Outlet portion 82 of tube 12 is coupled to a medication mixing valve 84 which includes a lower reduced diameter portion 88. Outlet end 82 of tube 12 is connected to portion 88 of valve 84 by fastening means 90 which may comprise a conventional hose clamp, for example.

Valve 84 preferably includes a removable fill plug 86 which is threaded as at 92 to mate with the tapped bore 94 of cylindrical valve 84.

Valve 84 is comprised of a centrally formed main mixing chamber 120 having a water inlet 116 and an outlet 118. Disposed at the lower portion of mixing chamber 120 at the interface with the reduced diameter portion 88 is a gasket, plug or washer 100 having a centrally formed generally circular mixing orifice 102 therein. Washer 100 is held in place by a plurality of prongs or struts 96 preferably integrally formed and extending downwardly from the lower portion of fill plug 86. The prongs or struts 96 preferably include L-shaped notches 98 formed at the lower inner portions thereof which serve as retaining means for cooperation with the outer periphery of washer 100.

Outlet 118 from valve 84 delivers the contents of mixing chamber 120 to the outlet channel 114 formed by outlet leg 104. Outlet leg 104 may be coupled to a medicine outlet pipe 106 (FIGS. 1 and 2) by a connector 108 which may be threadingly received on threaded end 112 of leg 104, flange 110 being provided as a sealing and stop means.

In operation, plugs 86 and 42 of valves 84 and 40 are first removed (plug 42 may, if desired, simply be loosened) along with their respective washers 100 and 58. The desired liquid medication is then poured into the opening defined by valve 84 so as to descend within portions 82 and 80 of coiled tube 12. The open orifice defined by the removal of plug 42 serves as an air outlet as the medicine is filled in the lowermost coils 66 of tube 12. The medicine will fill the bottom portion of the coiled tube 12 and will force air up through the upper coils 64, and portion 34 to exit via valve 40, until the desired amount of medication has been filled within tube 12.

It is generally preferable to maintain the coiled tube 12 in a horizontal orientation as illustrated in FIG. 3 during filling to avoid entrapment of air bubbles therewithin. After filling, the coil may be oriented in substantially any direction with equal effectiveness.

After the tube 12 has been filled as desired, washers 58 and 100 are reinserted and caps 42 and 86 are secured. The water supply is then actuated to deliver pressurized water to valve 40. Water pressure in direct fluid communication with inlet end 34 of tube 12 will force the medicine therein contained through the coil to exit through outlet portions 80 and 82, and subsequently through restricted orifice 102 to mixing valve 84. A portion of the water entering valve 40 from inlet pipe 20 will be admitted to mixing valve 84 via restricted orifice 60, conduit 62, and inlet port 116. This portion will be admixed with the medicine entering mixing chamber 120 from orifice 102, the mixed medicine and water being delivered to outlet conduit 114.

The amount of medicine admixed with the water supply in mixing chamber 120 may be easily controlled by the size of orifices 60 and 102. With the design indicated, I have achieved an effective and continuously controllable mixture of one ounce of fluid medicine per gallon of water delivered through outlet conduit 114.

An advantage of the present invention is the ability to visually observe the emptying of the colored medicine from the coiled tube 12, thereby providing a clear indication when refilling of the tube is necessary. The inner diameter of the tube 12 is chosen to minimize any mixing of the water and medicine therein to minimize dilution of the medicine prior to its admixture with the main water supply within mixing chamber 120. After the tube 12 has been nearly emptied of its medicinal contents, and prior to re-filling, the clear water contained within tube 12 may be drained by means of drainage valve 68.

It is seen that I have provided an extremely simple yet reliable medicator which utilizes no moving parts, and thereby minimizes maintenance and replacement requirements. Leakage is minimized, and reliability is insured by utilizing the main water supply as the direct motive force of the emptying of the medication into the mixing chamber. There are no moving parts to wear out or require replacement, and wasted medicine is minimized. For example, any settlement of the medicine in the bottom coils 66 of tube 12 may be easily utilized without waste by simply inverting the coil near the finish of an emptying phase.

Obviously, numerous modifications and variations of the present invention are possible in light of the above teachings. It is therefore to be understood that within the scope of the appended claims the invention may be practiced otherwise than as specifically described herein.

I claim as my invention:

1. Apparatus for mixing a first liquid with a second liquid which comprises:
    means for containing a first liquid which comprises a multiple-loop coiled tubular conduit having an inlet end and an outlet end;
    conduit means connected to said inlet end for providing a second liquid to be mixed with said first liquid;
    means coupled to said outlet end of said containing means for combining said first and second liquids; and
    said second liquid comprising means in fluid communication with said containing means for driving said first liquid to said combining means.

2. The liquid mixing apparatus as set forth in claim 1, wherein said combining means includes a first inlet port coupled to said conduit means, a second inlet port coupled to said outlet end of said containing means, a mixing chamber in fluid communication with said first and second inlet ports, and an outlet port for delivering the contents of said mixing chamber.

3. The liquid mixing apparatus as set forth in claim 2, wherein said second inlet port includes reduced diameter orifice means for controlling the amount of said first liquid admitted to said mixing chamber.

4. The liquid mixing apparatus as set forth in claim 1 wherein said inlet end is disposed at the top of said coiled tubular conduit, and said outlet end is coupled to the bottom thereof.

5. The liquid mixing apparatus as set forth in claim 4, wherein said conduit means for providing said second liquid includes source means for delivering said second liquid, and valve means for receiving said second liquid from said source means and for directing a first portion thereof to said combining means and a second portion thereof to said inlet end of said tubular conduit.

6. The liquid mixing apparatus as set forth in claim 5, wherein said valve means includes an inlet coupled to said source means, a first outlet coupled to said inlet end of said tubular conduit, a central chamber disposed between and in fluid communication with said inlet and said first outlet, and a second outlet adjacent to and in fluid communication with said central chamber, said second outlet also being coupled to said combining means.

7. The liquid mixing apparatus as set forth in claim 6, wherein said valve means further comprises means disposed between said central chamber and said second outlet for controlling the amount of said second liquid delivered to said combining means.

8. The liquid mixing apparatus as set forth in claim 7, wherein said controlling means comprises reduced diameter orifice means disposed above said central chamber of said valve means.

9. The liquid mixing apparatus as set forth in claim 8, wherein said combining means includes a first inlet port coupled to said conduit means, a second inlet port coupled to said outlet end of said containing means, a mixing chamber in fluid communication with said first and second inlet ports, and an outlet port for delivering the contents of said mixing chamber.

10. The liquid mixing apparatus as set forth in claim 9, wherein said second inlet port includes reduced diameter orifice means for controlling the amount of said first liquid admitted to said mixing chamber.

11. The liquid mixing apparatus as set forth in claim 10, wherein said valve means and said combining means are each provided with removable closure tops.

12. The liquid mixing apparatus as set forth in claim 11, further comprising means for draining said containing means positioned near the bottom coil thereof.

13. The liquid mixing apparatus as set forth in claim 12, further comprising wire basket means for supporting said coiled tubular conduit.

14. The liquid mixing apparatus as set forth in claim 4, wherein said tubular conduit is comprised of a translucent plastic in order to enable visual observation of said first liquid therein contained.

15. The liquid mixing apparatus as set forth in claim 4, wherein said tubular conduit is coiled about a substantially vertical axis.

* * * * *